J. H. LINDSAY.
Vehicle-Hubs.
No. 166,283.  Patented Aug. 3, 1875.
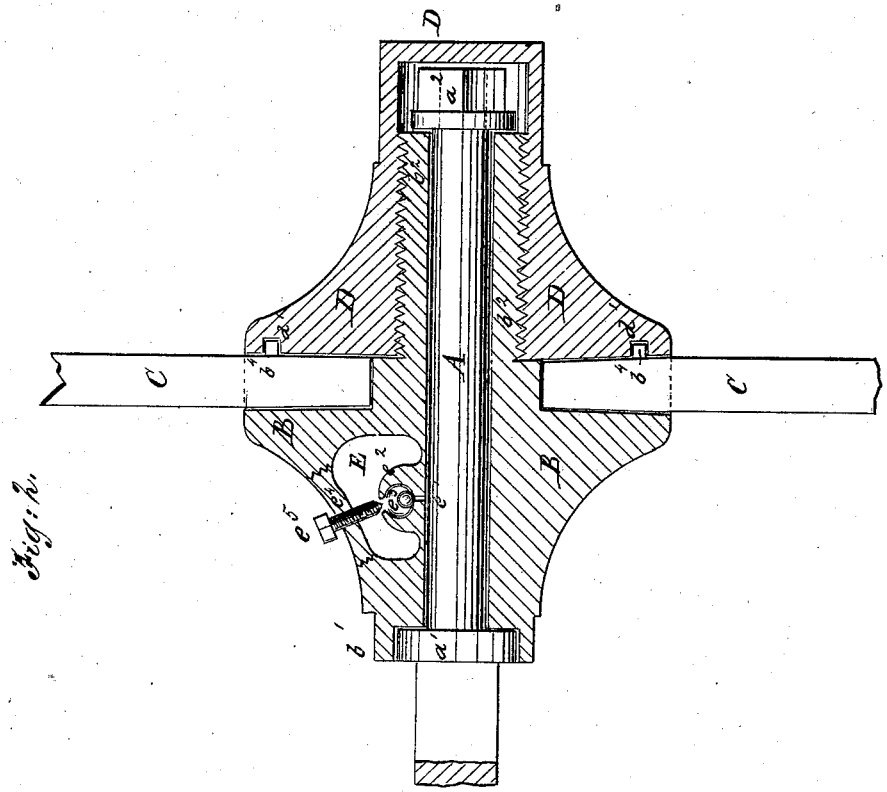
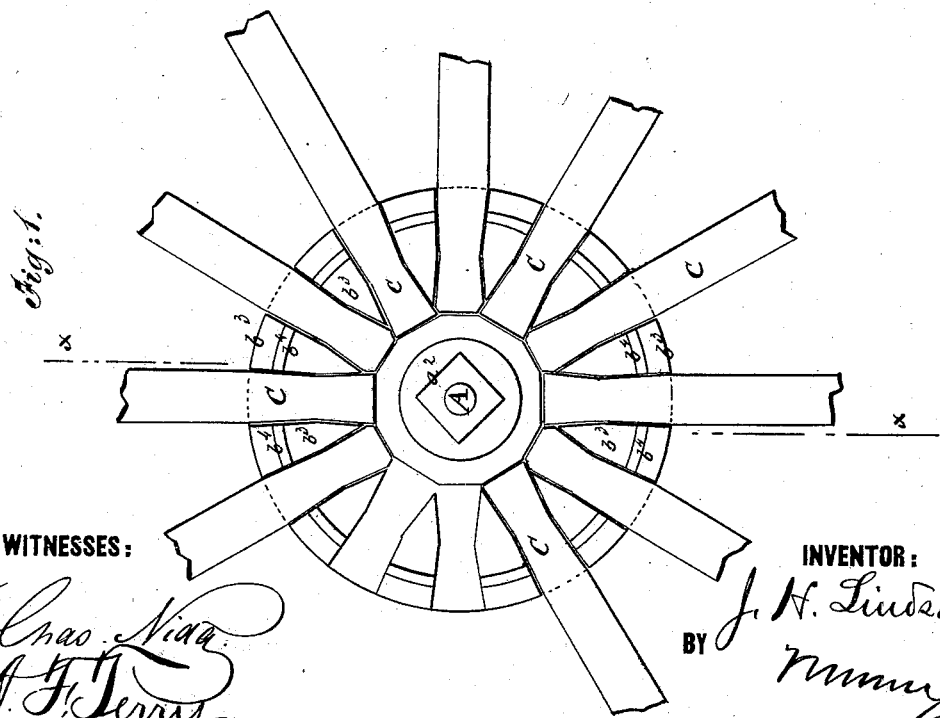
WITNESSES:  INVENTOR:
J. H. Lindsay
BY
ATTORNEYS.

UNITED STATES PATENT OFFICE.

JOSEPH H. LINDSAY, OF FREEHOLD, (WOODSIDE P. O.,) PENNSYLVANIA.

IMPROVEMENT IN VEHICLE-HUBS.

Specification forming part of Letters Patent No. 166,283, dated August 3, 1875; application filed May 1, 1875.

*To all whom it may concern:*

Be it known that I, JOSEPH H. LINDSAY, of Freehold, (Woodside P. O.,) in the county of Luzerne and State of Pennsylvania, have invented a new and useful Improvement in Hubs for Vehicle-Wheels, of which the following is a specification:

Figure 1 is a view of the outer end of one of my improved hubs, the screw-cap being removed. Fig. 2 is a longitudinal section of the same, taken through the line $x\,x$, and showing the screw-cap in place.

Similar letters of reference indicate corresponding parts.

The invention will first be described in connection with the drawing, and then pointed out in the claims.

A represents the axle-arm, which has a collar, $a^1$, formed upon its inner end, and a flanged nut, $a^2$, screwed upon its outer end. B is the inner part of the hub, which has a ring flange or projection, $b^1$, formed upon its inner end to project over the collar $a^1$ of the axle-arm A, to serve as a mud-band to keep out mud and dust. Upon the middle part of the outer end of the part B of the hub is formed a tubular projection, $b^2$, the outer end of which rests against the flange of the nut $a^2$, so that the said nut may keep the hub in place upon the axle-arm A. Upon the outer side or shoulder of the part B of the hub are formed wedge-shaped projections $b^3$, the inner parts of which are made with a sharper taper than their outer parts, so as to make the inner parts of the spaces between said projections dovetailed in form, so as to prevent the spokes C, the inner ends of which are fitted into said spaces, from being drawn out. The projections $b^3$ are made of a height equal to the breadth of the spokes C, so that the outer surfaces of said projections may be flush with the outer edges of said spokes. D is the outer part of the hub, which has a screw-hole in its center, to fit upon the screw-thread formed upon the outer surface of the tubular projection $b^2$ of the part B. The outer end of the part D is closed to cover the nut $a^2$, and thus prevent the egress of oil and the ingress of dust and mud. By this construction, when the part D is screwed up its inner end will rest against the projections $b^3$ and the edges of the spokes C, and thus lock the said spokes in place. Upon the outer parts of the projections $b^3$ are formed segments of a ring-flange, $b^4$, which enter a ring-groove, $d'$, in the part D, and thus strengthen the connection between the parts B D of the hub. In the body of the part B of the hub is formed a chamber, E, to receive the oil, from which chamber a hole, $e^1$, leads into the bore of the hub, and through which the oil passes to the axle-arm A. The inner end of the hole $e^1$ is surrounded with a recessed or cup-shaped projection, $e^2$, in which is placed a ball, $e^3$, to act as a valve to prevent the oil from flowing through the hole $e^1$ when the wheel happens to stop with the oil-chamber E upward. From the oil-chamber E a hole, $e^4$, leads out through the body of the part B of the hub, through which the oil is poured into said oil-chamber E, and which is closed with a screw, $e^5$. The screw $e^5$ should be of such a length that its inner end may serve as a stop to prevent the ball $e^3$ from escaping from the recess of the projection $e^2$, when the oil-chamber is carried around by the revolution of the wheel.

Having thus described my invention, I claim as new and desire to secure by Letters Patent—

1. The chamber E, having a median automatic valve, $e^3$, and raised hollow valve-seat $e^2$ over the inlet-port $e^1$, as and for the purpose specified.

2. The segmental ring-flange $b^4$, formed upon the projections $b^3$ of the part B, in connection with the ring groove $d^1$, formed in the part D of the hub, substantially as herein shown and described.

JOSEPH HENRY LINDSAY.

Witnesses:
DANIEL BOCK,
ISAAC GOODMAN.